United States Patent
Ishmael, Jr. et al.

(10) Patent No.: US 10,494,473 B2
(45) Date of Patent: Dec. 3, 2019

(54) HYBRID NOVOLAC POLYUREA/POLYURETHANE

(71) Applicant: Raven Lining Systems Inc., Broken Arrow, OK (US)

(72) Inventors: William E. Ishmael, Jr., Tulsa, OK (US); David L. Stanley, Tulsa, OK (US); David J. Dunn, Aurora, OH (US)

(73) Assignee: Raven Lining Systems, Inc., Broken Arrow, OK (US)

( * ) Notice: Subject to any disclaimer, the term of this patent is extended or adjusted under 35 U.S.C. 154(b) by 247 days.

(21) Appl. No.: 15/457,251

(22) Filed: Mar. 13, 2017

(65) Prior Publication Data

US 2017/0260319 A1 Sep. 14, 2017

Related U.S. Application Data

(60) Provisional application No. 62/307,899, filed on Mar. 14, 2016.

(51) Int. Cl.
| | |
|---|---|
| *C08G 18/66* | (2006.01) |
| *C08G 18/76* | (2006.01) |
| *C09D 175/02* | (2006.01) |
| *C09D 175/04* | (2006.01) |
| *C09D 175/08* | (2006.01) |
| *C08G 18/48* | (2006.01) |
| *C08G 18/40* | (2006.01) |
| *C08G 18/54* | (2006.01) |
| *C08G 18/32* | (2006.01) |
| *C08G 18/08* | (2006.01) |
| *C08G 18/22* | (2006.01) |
| *C08G 18/24* | (2006.01) |

(52) U.S. Cl.
CPC ..... *C08G 18/6685* (2013.01); *C08G 18/0885* (2013.01); *C08G 18/227* (2013.01); *C08G 18/242* (2013.01); *C08G 18/3203* (2013.01); *C08G 18/324* (2013.01); *C08G 18/3215* (2013.01); *C08G 18/3225* (2013.01); *C08G 18/3284* (2013.01); *C08G 18/4027* (2013.01); *C08G 18/4804* (2013.01); *C08G 18/4841* (2013.01); *C08G 18/4879* (2013.01); *C08G 18/4895* (2013.01); *C08G 18/542* (2013.01); *C08G 18/546* (2013.01); *C08G 18/6688* (2013.01); *C08G 18/7664* (2013.01); *C09D 175/02* (2013.01); *C09D 175/04* (2013.01); *C09D 175/08* (2013.01); *C08G 2150/90* (2013.01)

(58) Field of Classification Search
CPC ............... C08G 18/542; C08G 18/546; C08G 18/3215; C08G 18/3225–3268; C08G 18/4879; C08G 18/3203–3221; C08G 18/4895; C08G 59/1444; C08G 18/4027; C08G 18/4841; C08G 18/6685; C08G 18/6688; C08G 18/7664; C08L 75/02; C08L 75/04; C08L 75/08; C09D 175/02; C09D 175/04; C09D 175/08

See application file for complete search history.

(56) References Cited

U.S. PATENT DOCUMENTS

| | | | |
|---|---|---|---|
| 2,838,473 A | 6/1958 | Partansky et al. | |
| 2,938,884 A | 5/1960 | Chern et al. | |
| 3,470,118 A | 9/1969 | Forster et al. | |
| 3,676,524 A * | 7/1972 | Takiyama | C08G 59/1461 525/502 |
| 3,686,101 A | 8/1972 | Davis et al. | |
| 4,046,721 A | 9/1977 | Austin et al. | |
| 5,246,978 A * | 9/1993 | Ozaki | C08G 18/4081 521/164 |
| 5,254,597 A | 10/1993 | Horn et al. | |
| 5,268,393 A | 12/1993 | Blout et al. | |
| 5,721,284 A * | 2/1998 | Smits | C08J 9/0061 521/112 |
| 6,562,932 B1 * | 5/2003 | Markusch | B32B 17/1077 528/58 |
| 6,660,782 B1 | 12/2003 | Matijega et al. | |
| 2005/0160661 A1 * | 7/2005 | Tuli | C10L 1/02 44/307 |
| 2011/0306702 A1 | 12/2011 | Klopsch et al. | |
| 2011/0313177 A1 | 12/2011 | Mecfel-Marczewski et al. | |
| 2012/0009407 A1 | 1/2012 | Peeler et al. | |
| 2012/0238641 A1 * | 9/2012 | Turk | A01N 25/30 514/772.1 |
| 2013/0231441 A1 | 9/2013 | Robertson et al. | |
| 2015/0099851 A1 | 4/2015 | Pinto et al. | |
| 2017/0233604 A1 * | 8/2017 | Watkins | C09D 163/00 427/427.4 |
| 2017/0306077 A1 * | 10/2017 | Chaffanjon | C08G 18/5012 |

OTHER PUBLICATIONS

Hassouma et al., "Design of a New Cardanol Derivative: Synthesis and Application as Potential Biobased Plasticizer for Poly(lactide)," Macromol. Mater. Eng. 301, 1267-1278 (Year: 2016).*

* cited by examiner

*Primary Examiner* — Kregg T Brooks
(74) *Attorney, Agent, or Firm* — Fay Sharpe LLP

(57) ABSTRACT

A hybrid polyurethane/polyurea polymer suitable for forming a coating on a structure which is in contact with water includes the reaction product of a polyol component consisting of one or more polyols, a polyamine, and a curing agent, such as a polyisocyanate. The polyol component includes a Novolac-type polyether polyol.

19 Claims, No Drawings

HYBRID NOVOLAC POLYUREA/POLYURETHANE

This application claims the benefit of U.S. Provisional Application Ser. No. 62/307,899, filed Mar. 14, 2016, the disclosure of which is incorporated herein by reference, in its entirety.

BACKGROUND

The exemplary embodiment relates to coating systems for structures in contact with water and finds particular application in waste water treatment and potable water systems.

Due, in part, to increasing environmental regulations and reduced or fluctuating water supplies in many areas, an environmentally friendly coating system is sought that can provide a variety of properties, such as excellent corrosion resistance, adhesion to a variety of substrates, excellent hydrophobicity, some flexibility, impact resistance, a relatively fast cure, and the ability to be applied in inclement weather conditions. It would also be advantageous to have a coating that can be used in both potable water and wastewater applications.

Existing coating systems while meeting some of these properties, often have limitations.

Epoxy coating systems provide excellent adhesion and corrosion protection in water and wastewater applications. However, most epoxy coating systems formulated for immersion conditions do not provide much flexibility. The lack of flexibility may result in "cracking" of the coating if the coated substrate has some movement. Furthermore, the cure speed of most epoxy coatings is slow resulting in delays while waiting for cure or to apply additional coats.

Polyurethanes provide good flexibility and can provide a fast cure speed. However, most polyurethanes do not perform well in wet or damp environments. This may be attributed to micro-foaming at the substrate surface due to the presence of water. The isocyanate portion of the reaction has an affinity or tendency to react with water faster than with the polyols and foaming is the result. This causes a loss of adhesion and some porosity in the coating.

Polyurea coating systems are well known for their speed of reaction, flexibility and ability to be applied in severe weather conditions. However, for maximum adhesion, most polyureas require a primer that can be applied only in favorable weather conditions. Further, some polyurea formulations are so fast curing that the resulting coating can have a sponge-like cell structure when viewed under a microscope. This structure can allow water (and other solutes) to pass through the coating much easier than some other coating systems.

There remains a need for a coating system that overcomes some or all of these problems.

INCORPORATION BY REFERENCE

The following references, the disclosures of which are incorporated by reference, are mentioned:

U.S. Pat. No. 3,686,101, issued Aug. 22, 1972, entitled POLYURETHANE FOAMS OF ORGANIC POLYISOCYANATES AND POLYOLS DERIVED FROM ALKYLENE DIAMINES AND NOVOLAC RESINS AND METHOD OF MAKING SAME, by Davis, et al. describes polyurethane foams prepared from organic polyisocyanates and a mixture of polyether polyols derived from (a) alkylene diamines and alkylene oxides and (b) novolac resins and alkylene oxides, and a method of making the polyurethane foams.

US Pub. No. 20120009407, published Jan. 12, 2012, entitled RIGID POLYURETHANE FOAM, by Peeler, et al., discloses a rigid polyurethane foam which includes the reaction product of an isocyanate composition and a resin composition including a novolac polyol having an average hydroxyl functionality of from 2 to 30 calculated by dividing the weight average molecular weight of the novolac polyol by the equivalent weight of the novolac polyol. The novolac polyol is present in an amount of from 3 to 65 parts by weight per 100 parts by weight of said resin composition.

US Pub. No. 20130231441, published Sep. 5, 2013, entitled COATING COMPOSITIONS INCORPORATING INGREDIENTS HAVING SECONDARY AMINE, HYDROXYL AND ISOCYANATE FUNCTIONALITY, by Robertson, et al., describes polyurea/polyurethane-based coating compositions.

U.S. Pub. No. 20150099851, published Apr. 9, 2015, entitled CNSL-BASED HYDROCARBON RESINS, PREPARATION AND USES THEREOF, by Pinto, et al., describes resins made from cashew nutshell liquid and vinyl hydrocarbons which can be used as precursors for the manufacture of epoxy resins and polyols for coating, adhesive and composite formulations exhibiting ameliorated performance in water repellency, anti-corrosion, and fast hardness development during cure.

BRIEF DESCRIPTION

In accordance with one aspect of the exemplary embodiment, a hybrid polyurethane/polyurea polymer is the reaction product of a curing agent, such as a polyisocyanate, a polyol component, and a polyamine.

The polyol component consists of one or more polyols, including a first polyether polyol, such as a phenol-based (Novolac) polyether polyol, having a phenol-based backbone.

The hybrid polyurethane/polyurea polymer reaction may be carried out in the presence of a catalyst.

The hybrid polyurethane/polyurea polymer reaction may be carried out at a temperature of at least 100° C.

In the hybrid polyurethane/polyurea polymer, a molar ratio of the polyol component to polyamine may be from 1:100 to 100:1, or from 1:10 to 10:1, or from 1:5 to 5:1, or from 3:1 to 1:3.

In the hybrid polyurethane/polyurea polymer reaction, a ratio by weight (or volume) of the polyol component to polyamine may be from 20:1 to 1:5, such as from 10:1 to 1:1, or from 5:1 to 2:1.

The first polyether polyol may have the general formula of Formula I:

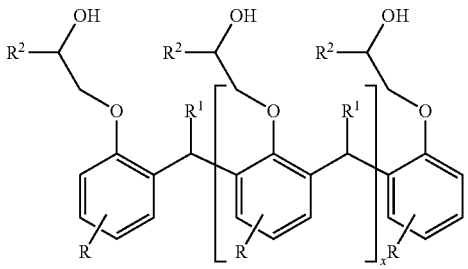

FORMULA I where each R is independently selected from H, and hydrocarbyl groups, such as $C_8$-$C_{20}$ fatty acids;

each $R^1$ independently selected from H and hydrocarbyl groups;

each $R^2$ is independently selected from ether groups and polyalkylene oxide groups, e.g., of from 2 to 15 ether units $C_{15}$ fatty acid;

x is at least 1, such as up to 100.

The first polyether polyol may be derived from Cashew Nut Shell Liquid.

The first polyether polyol may be derived from at least one phenolic lipid selected from alkyl benzoic acids and alkylresorcinols. The alkyl group of the alkyl benzoic acid and/or alkylresorcinol may be at least a $C_8$ alkyl group, or at least a $C_{10}$, or at least a $C_{12}$, or up to $C_{30}$, or up to $C_{20}$ alkyl group. For example, the first polyether polyol may be derived from greater than 50 wt. % anacardic acid and less than 50 wt. % cardol or its methyl derivatives.

In the hybrid polyurethane/polyurea polymer, the polyol may further include a second polyether polyol other than the Novolac-type polyol.

The second polyether polyol may include a high-molecular weight polyol having a molecular weight of 2000 to 10,000 or at least 3000, or at least 4000, or up to 7000 or up to 6000.

The second polyether polyol may be selected from a glycerine and propylene oxide based polyether triol, a polyether triol and mixtures thereof.

In the hybrid polyurethane/polyurea polymer, the second polyether polyol may include at least one of a propylene glycol-based diol, a glycerine-initiated propylene oxide-based triol with an ethylene oxide cap, an amine-based polyol, a glycerine and sucrose-based polyol, and a Mannich-based polyol.

The polyol component may further include a low molecular weight polyether polyol having an MW of less than 2000, or less than 1000, or less than 500.

The polyisocyanate may be selected from diisocyanates and triisocyanates, and mixtures thereof.

The polyisocyanate may be selected from 2,2'-methylene diphenyl diisocyanate (2,2'-MDI), 2,4'-methylene diphenyl diisocyanate (2,4'-MDI), 4,4'-methylene diphenyl diisocyanate (4,4'-MDI), toluene-2,4-diisocyanate (2,4-TDI), toluene-2,6-diisocyanate (2,4-TDI), 1,6-hexamethylene diisocyanate, 1,4-tetramethylene diisocyanate, 1,10-decamethylene diisocyanate, 1,5-naphthalene diisocyanate, cumene-2,4-diisocyanate, 4-methoxy-1,3-phenylene diisocyanate, 4-chloro-1,3-phenylene diisocyanate, 4-bromo-1,3-phenylene diisocyanate, 4-ethoxy-1,3-phenylene diisocyanate, 2,4'-diisocyanatodiphenylether, 5,6-dimethyl-1,3-phenylene diisocyanate, 2,4-dimethyl-1,3-phenylene diisocyanate, 4,4'-diisocyanato diphenylether, benzidine diisocyanate, 4,6-dimethyl-1,3-phenylene diisocyanate, 9,10-anthracene diisocyanate, 4,4'-diisocyanatodibenzyl, 3,3'-dimethyl-4,4'-diisocyanato diphenylmethane, 2,6-dimethyl-4,4'-diisocyanatodiphenyl, 2,4-diisocyanatostilbene, 3,3'-dimethyl-4,4'-diisocyanatodiphenyl, 3,3'-dimethoxy-4,4'-diisocyanatodiphenyl, 1,4-anthracene diisocyanate, 2,5-fluorene diisocyanate, 1,8-naphthalene diisocyanate, 2,6-2,6-diisocyanatobenzofuran, 2,4,6-toluene triisocyanate, 2,4,4'-triisocyanatodiphenylether, polymeric isocyanates, and mixtures thereof.

The polyisocyanate may include a polymeric methylene diphenyl diisocyanate.

The polyamine may be selected from diamines, triamines and tetramines, and mixtures thereof.

The polyamine is selected from alkylated one-ringed aromatic primary diamines, such as 3,6-di-n-butyl-1,2-benzenediamine, 4,6-di-n-propyl-1,3-benzenediamine, 2,5-dioctyl-1,4-benzenediamine, 2,3-diethyl-1,4-benzenediamine, 4,5,6-trihexyl-1,3-benzenediamine, 2,4,6-triethyl-1,3-benzenediamine, 2,4-diethyl-6-methyl-1,3-benzenediamine, 4,6-diethyl-2-methyl-1,3-benzenediamine, 2,4-diisopropyl-6-methyl-1,3-benzenediamine, 2-methyl-4,6-di-sec-butyl-1,3-benzenediamine, 2-ethyl-4-isopropyl-6-methyl-1,3-benzenediamine, 2,3,5-tri-n-propyl-1,4-benzenediamine, 2,3-diethyl-5-sec-butyl-1,4-benzenediamine, 3,4-dimethyl-5,6-diheptyl-1,2-benzenediamine, 2,4,5,6-tetra-n-propyl-1,3-benzenediamine, 2,3,5,6-tetraethyl-1,4-benzenediamine, and other alkylated m-phenylenediamines, such as dialkylated and trialkylated m-phenylenediamines propoxylated ethylene diamines (PED), and mixtures thereof.

The polyisocyanate, or other curing agent, may be used in an approximately stoichiometrically equivalent amount to the total amount of hydroxyls and amine groups in the polyol and polyamine.

A ratio of moles isocyanate groups:moles of hydroxyl and amine groups may be from 1.5:1 to 1:1.5.

A monofunctional alcohol, amine, or isocyanate molecule may be utilized in combination with the diisocyanate for controlling the final MW.

In accordance with one aspect of the exemplary embodiment, a two component formulation includes components, which when combined, form a coating comprising the hybrid polyurethane/polyurea polymer.

The polyisocyanate may be in a first component and the polyol and polyamine may be a second component.

The two component formulation may further include at least one additive selected from thickeners, organic and inorganic fillers, emulsifiers, surface-active stabilizers, pigments, dyes, UV-light stabilizers, flow modifiers, antioxidants, fibers or other reinforcing materials, antistatic agents, plasticizers, moisture scavengers, antifoaming agents, mold release agents, air release additives, thixotropes, leveling additives, flame retardants, dispersants, biocides, fungicides, corrosion inhibitors, wetting and dispersing agents, coloring agents or other visual enhancement additives, and mixtures thereof. These additives may be present, for example at a total of from 0.1-40 wt. % the formulation.

In accordance with one aspect of the exemplary embodiment, a method for forming a hybrid polyurethane/polyurea polymer includes reacting a polyisocyanate, a polyol component, and a polyamine in the presence of a catalyst. The polyol component includes a Novolac-type polyol.

The method may include mixing the first and second components at a sufficient temperature for reaction to occur, the first component including the polyisocyanate and the second component including the polyol and polyamine.

In accordance with another aspect of the exemplary embodiment, a method for coating a structure includes applying the two component formulation as a heated mixture to a structure.

The method may further include applying a primer to the structure prior to applying the two-component formulation to the structure.

The applying the two component formulation may include applying a plurality of layers of the mixture, with a time interval between each application.

The structure being coated can be a potable water pipe or a waste water pipe.

In accordance with another aspect of the exemplary embodiment, a structure coated with the hybrid polyurethane/polyurea polymer or the coating formulation as described above.

DETAILED DESCRIPTION

Aspects of the exemplary embodiment relate to a composition comprising a hybrid polyurethane/polyurea polymer, a method of making the hybrid polyurethane/polyurea polymer, a coating formulation derived from the hybrid polyurethane/polyurea polymer, and methods of coating a structure with the coating formulation.

The composition includes a hybrid polyurethane/polyurea polymer and may comprise the reaction product of a curing agent, such as a polyisocyanate, a polyol component, and a polyamine. In one embodiment, the polyol component comprises (or consists essentially of, or consists only of) a first polyether polyol with a phenol-based backbone (referred to herein as a Novolac-type polyol). In some embodiments, the polyol may further include at least one of a second, high molecular weight polyether polyol and a third, low molecular weight polyol.

To form the hybrid polyurethane/polyurea polymer, the polyisocyanate may be reacted with a blend of the polyol and polyamine, optionally in the presence of a catalyst and/or other reagents commonly used in the formation of polyurethanes and polyureas.

A molar ratio of the polyol (e.g., Novolac-type polyol) to polyamine in the blend may be from 1:100 to 100:1, such as from 1:10 to 10:1, or from 1:5 to 5:1. A ratio by weight (or volume) of the polyol (e.g., Novolac-type polyol) to polyamine in the blend may be from 20:1 to 1:5, such as from 10:1 to 1:1 or from 5:1 to 2:1.

The Novolac-type polyol may have the general formula of Formula I:

FORMULA I

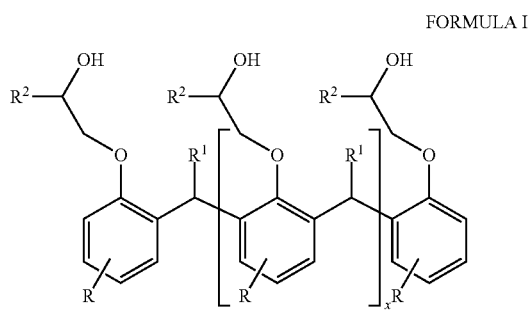

where each R is independently selected from H, and hydrocarbyl groups each $R^1$ independently selected from H and hydrocarbyl groups;

each $R^2$ is independently selected from ether groups and poly alkylene oxide groups, e.g., of from 2 to 15 ether units;

x is at least 1, such as up to 100.

In one embodiment, R is a $C_8$ or higher, such as up to $C_{30}$, e.g., $C_{10}$-$C_{20}$ unsaturated fatty acid, such as an unbranched fatty acid having zero, one, two, or more double bonds. Example unsaturated fatty acids include myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, and docosahexaenoic acid. Example saturated fatty acids include capric acid, undecylic acid, lauric acid, tridecylic acid, myristic acid, pentadecylic, acid, palmitic acid, margaric acid, stearic acid nonadecylic acid, arachidic acid, heneicosylic, acid, and behenic acid.

Novolac-type polyether polyols, for example, can be the alkoxylation products of a phenol-aldehyde resin, which is formed by the elimination reaction of phenol with an aldehyde, such as formaldehyde, in the presence of an acid catalyst, such as glacial acetic acid, followed by concentrated hydrochloric acid. Usually a small amount of the acid catalyst or catalysts is/are added to a miscible phenol, followed by an aldehyde, such as formaldehyde. The formaldehyde reacts between two phenols to form a methylene bridge, creating a dimer by electrophilic aromatic substitution between the ortho and para positions of phenol and the protonated formaldehyde. As concentration of dimers increase, trimers, tetramers and higher oligomers may also form. By controlling the molar ratio of formaldehyde to phenol at somewhat less than 1, the degree of polymerization can be controlled. The Novolac resin may then be alkoxylated to build the molecular weight to a desired level, e.g., from about 300 to about 1500. Phenols which may be used to prepare the Novolac resin include: o-, m-, or p-cresols, ethylphenol, nonylphenol, p-phenylphenol, 2,2-bis(4-hydroxyphenol)propane, beta-naphthol, beta-hydroxyanthracene, p-chlorophenol, o-bromophenol, 2,6-dichlorophenol, p-nitrophenol, 4-nitro-6-phenylphenol, 2-nitro-4-methylphenol, 3,5-dimethylphenol, p-isopropylphenol, 2-bromo-4-cyclohexylphenol, 4-t-butylphenol, 2-methyl-4-bromophenol, 2-(2-hydroxypropyl)phenol, 2-(4-hydroxyphenol)ethanol, 2-carbethoxyphenol, and 4-chloro-methylphenol. The phenols used to prepare the Novolac-type polyether polyols may be substituted or unsubstituted. Suitable Novolac-type polyether polyols may be produced, for example, by reacting a condensate adduct of phenol and formaldehyde with one or more alkylene oxides including ethylene oxide, propylene oxide, and butylene oxide. Methods for preparing such polyether polyols are described, for example, in U.S. Pat. Nos. 2,838,473, 2,938,884, 3,470,118, 3,686,101, and 4,046,721. Novolac-type polyols may also be derived from the reaction of aldehydes with phenolic lipids, such as alkyl benzoic acids (salicylic acid substituted with an unsubstituted or substituted alkyl chain that has from, for example, 10-20 carbon atoms, e.g., anacardic acids) and alkylresorcinols with an unsubstituted or substituted alkyl chain that has from, for example, 10-20 carbon atoms, such as cardol, and mixtures thereof.

The exemplary Novolac polyol may include a polyether polyol derived from Cashew Nut Shell Liquid (CNSL), a non-food source renewable material which contains mainly anacardic acid (2-hydroxy-6-pentadecylbenzoic acid) and a smaller amount of cardol (5-pentadecylresorcinol) and its methyl derivatives, such as 2-methyl-5-pentadecylresorcinol and 4-methyl-5-pentadecylresorcinol. The CNSL-based formula contains the Novolac structure in the backbone, as illustrated in Formula II.

FORMULA II

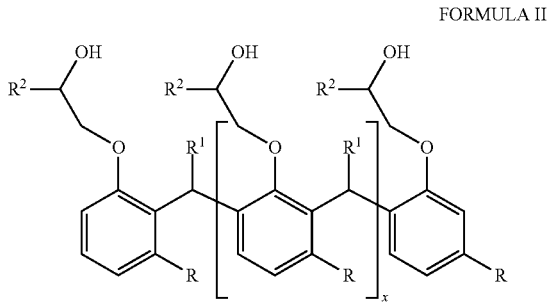

The illustrated structure contains aromatic rings which greatly increase the heat resistance, chemical resistance and continuity of the molecule. Additionally, the exemplary polyol contains a $C_8$-$C_{20}$ fatty acid side chain as the R group, e.g., each R is independently a $C_{15}$-$C_{17}$ chain derived, for example, from anacardic acid or cardol, which increases the flexibility and hydrophobicity while decreasing surface tension resulting in excellent adhesion properties. Furthermore, the functionality is approximately 4.3 resulting in much greater crosslink density. The structure contains no "ester" functionality to allow for hydrolyzation in basic solutions. While other bio-based polyols with similar molecular weights may be used, they do not contain this structure and do not provide the same degree of chemical resistance.

The polyol according to Formula I or II may have a hydroxyl value of at least 100 or at least 120, or at least 150, or at least 160 or up to 200. The hydroxyl value is defined as the number of milligrams of potassium hydroxide required to neutralize the acetic acid taken up on acetylation of one gram of the polyol.

Suitable Novolac-type polyols according to Formula II based on renewable, cashew nutshell liquid (CNSL) include Cardolite® NX 9001, available from Cardolite.

In one embodiment, the Novolac-type polyol (and/or other polyether polyol) may be used to produce a polyurethane (e.g., using a ratio of Novolac-type polyol to polyisocyanate of about 1:3 by volume) and a polyurea (using a ratio of Novolac-type polyol to polyamine of about 1:1 by volume). The formulas are different volume ratio, therefore resulting in different organic content amounts, but still contain the Novolac structure in the backbone.

The polyol component may further include other polyols, such as polyether polyols. The other polyether polyol may be a high-molecular weight polyol having a molecular weight of 2000 to 10,000 or at least 3000, or at least 4000, or up to 7000 or up to 6000.

Examples of suitable polyols which may be used herein are disclosed, e.g., in U.S. Pat. Nos. 5,254,597; 5,268,393; and 6,660,782; the disclosures of which are hereby incorporated by reference in their entireties. Examples of suitable commercially available polyether polyols include, e.g., polyether polyols available from Carpenter Company of Richmond, Va. (USA) under the Carpol® designation, for example: propylene glycol-based diols made with propylene oxide and available under the designations Carpol® PGP-400, PGP-1000, PGP-2000, and PGP-4000; propylene glycol-based diols made with propylene oxide and 50% ethylene oxide cap and available under the designations PGP-2050 and PGP-4025; glycerine-based triols made with propylene oxide and available under the designations GP-700, GP-1000, GP-1500, GP-3000, GP-4000 and GP-5000; glycerine-based triols made with propylene oxide and 25% ethylene oxide cap and available under the designations GP-725, GP-1535, GP-3008, GP-3510, GP-4520, GP-5015, GP-6015 and GP-6515; sucrose, amine-based polyols with high functionality and low viscosity and available under the designations SPA-357 and SPA-530; glycerine, sucrose-based polyols with high viscosity made with propylene oxide and available under the designation "GSP-355"; Mannich-based polyol available under the designation MX-470; triol-based, acrylonitrile dispersed polymer polyols available under the designation GAN-5021; and triol-based, SAN dispersed polymer polyols available under the designation GSAN-5022.

In one embodiment, the other polyether polyol is selected from: a 5000 MW glycerine and propylene oxide based polyether polyol triol (i.e., x=1) with 15% ethylene oxide cap, available from Carpenter Co. Chemicals Division, Richmond Va. 23230 under the trade name Carpol® GP-5015; a polyether triol with an average molecular weight of 4500, OH number average: 35, available from Haltermann (Monument Chemical Group) under the trade name Poly G 85-34; a 4900 molecular weight glycerine and propylene oxide-based polyether triol, OH number average: 35, available from The Dow Chemical Company under the trade name Voranol® 4701, and mixtures thereof. The polyether polyol may also include a low molecular weight polyol (MW less than 2000, or less than 1000, or less than 500) such as Poly Q® 40-770, a polyether polyol with an average molecular weight of 292, available from Haltermann (Monument Chemical Group.

Exemplary polyisocyanates suitable as curing agents include diisocyanates and triisocyanates, including aromatic diisocyanates such as toluene diisocyanate (TDI), methylene diisocyanates (MDI)s, methylene diphenyl diisocyanates, and mixtures thereof.

Representative polyisocyanates include 2,2'-methylene diphenyl diisocyanate (2,2'-MDI), 2,4'-methylene diphenyl diisocyanate (2,4'-MDI), 4,4'-methylene diphenyl diisocyanate (4,4'-MDI), toluene-2,4-diisocyanate (2,4-TDI), toluene-2,6-diisocyanate (2,4-TDI), 1,6-hexamethylene diisocyanate, 1,4-tetramethylene diisocyanate, 1,10-decamethylene diisocyanate, 1,5-naphthalene diisocyanate, cumene-2,4-diisocyanate, 4-methoxy-1,3-phenylene diisocyanate, 4-chloro-1,3-phenylene diisocyanate, 4-bromo-1,3-phenylene diisocyanate, 4-ethoxy-1,3-phenylene diisocyanate, 2,4'-diisocyanatodiphenylether, 5,6-dimethyl-1,3-phenylene diisocyanate, 2,4-dimethyl-1,3-phenylene diisocyanate, 4,4'-diisocyanatodiphenylether, benzidine diisocyanate, 4,6-dimethyl-1,3-phenylene diisocyanate, 9,10-anthracene diisocyanate, 4,4'-diisocyanatodibenzyl, 3,3'-dimethyl-4,4'-diisocyanatodiphenylmethane, 2,6-dimethyl-4,4'-diisocyanatodiphenyl, 2,4-diisocyanatostilbene, 3,3'-dimethyl-4,4'-diisocyanatodiphenyl, 3,3'-dimethoxy-4,4'-diisocyanatodiphenyl, 1,4-anthracenediisocyanate, 2,5-fluorene diisocyanate, 1,8-naphthalene diisocyanate, 2,6-2,6-diisocyanatobenzofuran, 2,4,6-toluene triisocyanate, 2,4,4'-triisocyanatodiphenylether, and mixtures thereof.

Other representative polyisocyanates include polymeric isocyanates, such as polymeric MDI of the general form

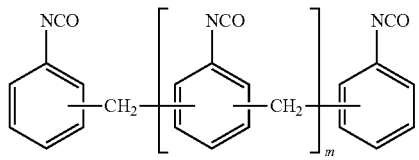

where m is at least 1 or at least 2.

Suitable polymeric MDIs have an isocyanate number (NCO) (or NCO weight percentage) of greater than about 23, or greater than about 25. Examples of suitable polymeric MDIs include those sold under the tradename LUPRANATE®, available from BASF Corporation (Wyandotte, Mich.); MONDUR®, available from Bayer Material Science LLC (Pittsburgh, Pa.); and PAPI®, available from The Dow Chemical Company (Midland, Mich.).

Suitable polyamines include diamines, such as alkylated one-ringed aromatic primary diamines, including 3,6-di-n-butyl-1,2-benzenediamine, 4,6-di-n-propyl-1,3-benzenediamine, 2,5-dioctyl-1,4-benzenediamine, 2,3-diethyl-1,4-benzenediamine, 4,5,6-trihexyl-1,3-benzenediamine, 2,4,6-triethyl-1,3-benzenediamine, 2,4-diethyl-6-methyl-1,3-benzenediamine, 4,6-diethyl-2-methyl-1,3-benzenediamine, 2,4-diisopropyl-6-methyl-1,3-benzenediamine, 2-methyl-4,6-di-sec-butyl-1,3-benzenediamine, 2-ethyl-4-isopropyl-6-methyl-1,3-benzenediamine, 2,3,5-tri-n-propyl-1,4-benzenediamine, 2,3-diethyl-5-sec-butyl-1,4-benzenediamine, 3,4-dimethyl-5,6-diheptyl-1,2-benzenediamine, 2,4,5,6-tetra-n-propyl-1,3-benzenediamine, 2,3,5,6-tetraethyl-1,4-benzenediamine, and other alkylated m-phenylenediamines, such as dialkylated and trialkylated m-phenylenediamines described, for example in U.S. Pat. No. 4,760,185, incorporated herein by reference, where the alkyl group may be, for example, a $C_1$-$C_6$ alkyl group, propoxylated ethylene diamines (PED), and mixtures thereof. An example mixture is sold under the trade name ETHACURE®, available from Albemarle Corporation Baton Rouge, La., such as ETHACURE® 100, which includes a mixture of 75-81 wt. % 3,5-diethyltoluene-2,4-diamine, 18-20 wt. % 3,5-diethyltoluene-2,6-diamine, 0.5-3 wt. % dialkylated m-phenylenediamines, and <0.08 wt. % water, and LONZACURE®, available from Lonza Ltd, Basel, Switzerland, such as LONZACURE™ DETDA 80 (4,6-diethyl-2-methyl-1,3-benzenediamine). Propoxylated ethylene diamines include tetra (2-hydroxypropyl) ethylenediamines available from BASF under the tradename QUADROL®, such as QUADROL® 204. As used herein, "polyamines" also encompasses amine-terminated polyethers, and polymercaptans.

Other curing agents are polycyclic carbonates (1,3-dioxolan-2-ones), as described, for example, in U.S. Pub. Nos, 20110306702 and 20110313177.

The polyisocyanate or other curing agent can be used in an approximately stoichiometrically equivalent amount to the total amount of hydroxyls and amine groups (where present) in the formulation in the polyol and polyamine, such that the number of moles of isocyanate groups is approximately equal to the number of moles of hydroxyl and amine groups e.g., in a ratio of moles isocyanate groups: moles (hydroxyl and amine groups) of from 1.5:1 to 1:1.5.

Suitable catalysts include tin-based catalysts, such as those sold under the tradenames FOMREZ®, available from Witco (Taft, La.); and DABCO®, available from Air Products, and bismuth-based catalysts, such as COSCAT® 83, available from Vertellus Specialties Inc., and zinc-based catalysts, such as COSCAT® Z-22, an organozinc compound available from Vertellus Specialties Inc. The catalyst may be used at from 0.001 wt. % to 0.2 wt. % the polyisocyanate plus polyol plus polyamine.

A monofunctional alcohol, amine, or isocyanate molecule can be utilized in combination with the diisocyanate for controlling the final MW.

Coating Formulation

The coating formulation may be a two component coating composition, one component including the polyisocyanate and the other including the polyol and polyamine.

The coating formulation can optionally include additional additives, as are known in the art. Examples of these include thickeners, organic and inorganic fillers, emulsifiers, surface-active stabilizers, pigments, dyes, UV-light stabilizers, flow modifiers, antioxidants, fibers or other reinforcing materials, antistatic agents, plasticizers, diluents, moisture scavengers, antifoaming agents, mold release agents, air release additives, thixotropes, leveling additives, flame retardants, dispersants, biocides, fungicides, corrosion inhibitors, wetting and dispersing agents, coloring agents or other visual enhancement additives, and the like. These additives may be present, for example at a total of from 0.1-40 wt. % the formulation, such as at least 1 wt. %, or at least 5 wt. %, or up to 30 wt. % of the formulation.

Example adhesion promoters include epoxy-functional silanes, such as those available under the trade mark SILQUEST by Momentive Performance Materials Inc., such as Silquest* A-187 (gamma-glycidoxypropyltrimethoxysilane) and Silquest* A-186 (beta-(3,4-epoxycyclohexyl)ethyltrimethoxysilane).

Example corrosion inhibitors include those that are heavy metal free, such as calcium phosphate-based inhibitors, available under the trade name HALOX® 430 JM, available from ICL Performance Products (ICL Group).

Example moisture scavengers include those containing a zeolite, such as VORATRON™ EG 711, a 50% paste of L powder in castor oil, available from Dow Chemical Company, and Baylith L paste from Bayer, a 50% paste of potassium calcium sodium aluminosilicate of the zeolite A type.

UV light stabilizers and antioxidants may be incorporated in the coating formulation to inhibit oxidation and light degradation. Examples of UV light stabilizers may be used at from 0.05 wt. % to about 5 wt. %, of the coating formulation.

Light stabilizers may be used, at from 0.05 wt. % to 5 wt. %, or from 0.5 wt. % to 2 wt. %. Example light stabilizers include those sold under the tradenames TINUVIN® and CHIMASSORB®, available from Ciba (BASF Corporation, Florham Park, N.J.).

Antioxidants may be used, at from 0.01 wt. % to 3 wt. %, or between 0.1 wt. % and 2 wt. % of coating formulation. Examples of antioxidants include those sold under the tradenames IRGANOX®, and BHT, available from Ciba (BASF Corporation).

Wetting and dispersing additives for dispersing pigments, such as inorganic pigments, organic pigments, and titanium dioxide, include solutions of a salt of unsaturated polyamine amides and lower molecular weight acid polymers, such as ANTI-TERRA®-U 80, a solution of a lower molecular weight unsaturated polycarboxylic acid polymer and a polysiloxane copolymer, such as BYK®-P 104 and polyether modified polydimethylsiloxanes, such as BYK® 307 from Byk Adhesives & Instruments. The wetting/dispersing agent may be present at 0.2-5 wt. % of the weight of the pigments used (or weight of the composition).

Examples of inert diluents that may be used include aliphatic linear, branched or cyclic ethers having 4 to 20 carbon atoms and mixed aliphatic-aromatic ethers having 7 to 20 carbon atoms, such as dibenzyl ether, tetrahydrofuran, 1,2-dimethoxyethane or methoxybenzene; aliphatic linear, branched or cyclic or mixed aliphatic-aromatic ketones having 4 to 20 carbon atoms, such as butanone, cyclohexanone, methyl isobutyl ketone or acetophenone, aliphatic linear, branched or cyclic or mixed aromatic-aliphatic alcohols having 4 to 20 carbon atoms, such as methanol, ethanol, butanol, 2-propanol, isobutanol, isopropanol, benzyl alcohol, methoxypropanol or furfuryl alcohol; aliphatic linear, branched or cyclic or mixed aromatic-aliphatic esters such as methoxypropyl acetate; aliphatic linear, branched or cyclic or mixed aromatic-aliphatic hydrocarbons such as toluene, xylene, heptane and mixtures of aliphatic and aromatic hydrocarbons having a boiling range above 100° C. under normal pressure, as well as low-viscosity coumarone-indene resins or xylene-formaldehyde resins. Aliphatic alcohols having one phenyl radical, such as benzyl alcohol, 1-phenoxypropane-2,3-diol, 3-phenyl-1-propanol, 2-phenoxy-1-ethanol, 1-phenoxy-2-propanol, 2-phenoxy-1-propanol, 2-phenylethanol, 1-phenyl-1-ethanol or 2-phenyl-1-propanol, can be used. The diluents can be employed individually or as a mixture, e.g., from 0.1 to 20 wt. %, or up to 10 wt. %, or up to 5 wt. % or up to 1 wt. % of the formulation. In one embodiment, no diluent is used.

Example deaerators (and defoamers) include organo-modified polysiloxane containing fumed silica, such as TEGO® AIREX 900, available from Evonik Industries.

Suitable filler materials include those in fibrous, particulate, or other form made from inorganic materials, ceramics, composites, metallic filler, organic polymeric, glass, thermoplastics, silica beads, and the like. Example fillers include silica fillers, such as IMSIL® A-8, a fibrous material available from Unimin Corp., which is produced from an inert, naturally occurring alpha quartz with a unique grape-like morphology, and mica fillers, such as CD-3200 available from Mica Georgia Industrial Minerals. The filler material may be surface treated so that it may undergo reaction with at least one other compound in the mixture.

Example coating formulations can be prepared from the ingredients shown in TABLE 1. PBW=parts by weight.

TABLE 1

Example Formulations

| | | EXAMPLE A (PBW) | EXAMPLE B (PBW) |
|---|---|---|---|
| A-Side Components | | | |
| Polyisocyanate | polymeric diphenylmethane diisocyanate (PMDI) | 100 | 100.00 |
| B-Side Components | | | |
| Novolac-type polyol | based on renewable, cashew nutshell liquid | 20-80 | 30-65 |
| Other polyols | ethylene oxide-based polyether polyol (may be glycerine initiated) | 0-50 | 5-20 |
| Total polyol | | 20-80 | 50-75 |
| Polyamine | Tetra (2-hydroxypropyl) ethylenediamine, 2,4-diethyl-6-methyl-1,3-benzenediamine, 4,6-diethyl-2-methyl-1,3-benzenediamine | 2-10 | 3-7 |
| moisture scavenger | Zeolite-based | 0-5 | 1-5 |
| Adhesion promoter | epoxy functional silane | 0-2 | 0.12-1.5 |
| Wetting and Dispersing Additive | Polysiloxanes, salt of unsaturated polyamine amides and lower molecular weight acid polymers | 0-2 | 0.1-1 |
| Deaerator | organo-modified polysiloxane, containing fumed silica | 0-2 | 0.1-1 |
| Catalyst | bismuth-based catalyst and organozinc-based catalyst | 0.01-0.2 | 0.01-0.1 |
| Pigments/colorants | $TiO_2$ | 0-20 | 0.3-15 |
| Corrosion inhibitor | heavy metal free, e.g., Calcium phosphate based inhibitor | 0-10 | 0.1-8 |
| Fillers (excluding any $TiO_2$) | microcrystalline silica | 0-20 | 2-15 |
| Total B side | | 100 | 100.00 |

The coating can be applied to a structure such as a concrete and/or metal structure. The coating composition can be applied with a spray gun or other suitable applicator. For example, high pressure, heated, plural component spray equipment that includes an in-line static mixing wand. Examples of this type of equipment include a GRACO® HYDRACAT, XP 50, or XP 70, or a Graco RAC® gun using a 531 to 535 tip.

The components may have different viscosities, and thus the components may be heated prior to spraying to a suitable temperature such as a minimum of 80° F. (~27° C.) for the polyisocyanate and a minimum of 120° F. (~49° C.) for the polyol/polyamine mixture, which may be maintained under agitation during spraying, e.g., with a paddle type drum mixer.

The application of the coating composition to a structure such as a concrete or steel pipe may involve a two-stage cure that provides a high build and maximum "wet-out" of the substrate. Stage 1 is a reaction that causes gelation within 15-30 seconds after the two components are mixed. Stage 2 is a "thru-cure" that occurs approximately 30-45 minutes after the components are combined. Two or more coats may be applied, for example 20-40 mils is applied in one coat and allowed to cure for 60 seconds prior to applying another coat. Successive coats may be applied in this manner up to, for example, 300 mils to allow for the first stage cure mechanism to react and build body.

A primer may be applied prior to the application of the composition. Depending on the substrate, the use of primer may improve long term corrosion resistance and help prevent concrete outgassing. Exemplary primers are those sold under the tradenames Raven 171, 171FS, 175, 560, 562, and 563 (for concrete) and AQUATAPOXY® 90 (for steel), both of which are available from Raven Lining Systems, Broken Arrow Okla. 74012. Surface pretreatment may also include solvent cleaning, shot blasting or other surface pretreatment.

Example uses include coating of substrates such as concrete, steel, aluminum, wood, composites, for example for concrete or steel water/waste water linings, general maintenance coatings in immersion conditions, geotextile fabric linings, potable water tanks, reservoirs, basins and pipes, and concrete waterproofing.

Without intending to limit the scope of the exemplary embodiment, the following examples illustrate exemplary coating formulations.

EXAMPLES

Example A

A two part coating formulation is prepared as shown in Table 2:

TABLE 2

| | Example | Tradename | PBW | % |
|---|---|---|---|---|
| A-Side Components | | | | |
| isocyanate | polymeric diphenylmethane diisocyanate (PMDI) | Mondur ® MR Light | 100.00 | 100 |
| B-Side Components | | | | |
| Novolac-type Polyether Polyol | based on renewable, cashew nutshell liquid (CNSL). | Cardolite ® NX 9001 | 54.50 | 54.500 |
| High MW polyol | glycerine and propylene oxide based polyether polyol triol with 15% ethylene oxide cap (average MW = 5000); polyether triol (average MW = 4500), glycerine and propylene oxide-based polyether triol (average MW = 4900) | Carpol ® GP-5015, Poly G ® 85-34, Voranol ™ 4701 | 15.10 | 15.100 |
| Low MW polyol | Polyether polyol with an average molecular weight of 292 | Poly Q ® 40-770 | 0.16-4.0* | 0.16-4.0 |
| Polyamine | tetra (2-hydroxypropyl) ethylenediamine (MW = 770) | Quadrol ® 204 | 1.5-2.50* | 1.5-2.500 |
| Polyamine | 2,4-diethyl-6-methyl-1,3-benzenediamine and/or 4,6-diethyl-2-methyl-1,3-benzenediamine | ETHACURE ™ 100/ LONZACURE ™ DETDA 80 | 2.50 | 2.500 |
| moisture scavenger | 50 wt. % potassium calcium silicate powder in castor oil | VORATRON ™ EG 711, Baylith L paste | 3.00 | 3.000 |
| Adhesion promoter | epoxy functional silane | Silquest* A-187 (gamma-glycidoxypropyltrimethoxysilane) | 0.80 | 0.800 |
| Wetting and Dispersing Additives | Polysiloxanes, salt of unsaturated polyamine amides and lower molecular weight acid polymers | Anti-Terra ®-U 80, Byk ® P140, Byk ® 307 | 0.40 | 0.400 |
| Deaerator | organo-modified polysiloxane, containing fumed silica | Airex 900 | 0.20 | 0.2 |
| Catalyst (80:10:10) | polyol/bismuth-based catalyst/organozinc | 50:50 bismuth based: zinc based (mixed in some of the glycerine initiated polyether) | 0.04 | 0.04 |
| White Pigment | TiO$_2$ | | 10.00 | 10 |
| Black pigment | | | 0.40 | 0.400 |
| Corrosion inhibitor | (heavy metal free) Calcium phosphate based inhibitor | Halox ® 430 JM | 5.00 | 5.000 |
| Filler | microcrystalline silica filler | | 3.00 | 3 |
| Filler | Mica powder | | 4.00 | 4 |
| Total B side | | | 100 | 100 |

*Some of Poly Q ® 40-770 is included in the amount of the tetra (2-hydroxypropyl) ethylenediamine.

Table 3 shows some details of the formulation.

TABLE 3

| Formulation properties | | | |
|---|---|---|---|
| A-side | | | |
| A-Side Total MEQ | 757.6 | % NCO | 31.833 |
| A-Side MEQ/Gram | 7.6 | Formulation Index | 1.075 |
| A-Side Specific Gravity (Calculated) | 1.2 | Weight Ratio (A:B) | 0.351 |
| A-Side Total Volume | 80.6 | Volume Ratio (A:B) | 0.332 |
| A-Side PBW Total | 100.0 | Hardblock Content | 0.013 |
| A-Side Equiv. Weight | 132.0 | | |
| B-side | | | |
| B-Side Total MEQ | 247.5 | | |
| B-Side MEQ (100 gram) | 247.5 | | |
| B-Side MEQ/Gram | 0.6 | | |
| B-Side Specific Gravity (Calculated) | 1.2 | | |
| B-Side Total Volume | 85.2 | | |
| B-Side PBW Total | 100.0 | | |
| B-Side Equiv. Weight | 404.1 | | |

The two-part coating formulation, when sprayed onto a structure, with or without a primer, shows excellent properties.

Corrosion Protection Studies

The composition was formulated as 1:1 by volume part A:part B mixed ratio and sprayed like a conventional polyurea utilizing a heated plural component pump such as a Graco Reactor© HXP2 or EXP 2 using a high pressure impingement gun and heated hose.

Salt Spray testing (ASTM B117-16, "Standard Practice for Operating Salt Spray (Fog) Apparatus") and Prohesion testing (ASTM G85-11, "Standard Practice for Modified Salt Spray (Fog) Testing") were performed on sprayed steel panels (media blasted, without primer). The panels exhibited good resistance.

Results for 2 panels after 1104 hours are shown in TABLE 4. Tests were performed according to ASTM D1654-08, D610-08, and D714-02 (blistering).

TABLE 4

| Corrosion test results | | | | |
|---|---|---|---|---|
| | Scribe creep | Scribe Blister | Field Corrosion | Field Blister |
| Salt Spray | | | | |
| Panel 1 | 8 | 10 | 10 | 10 |
| Panel 2 | 8 | 10 | 10 | 10 |
| Prohesion | | | | |
| Panel 1 | 9 (<0.5 mm) | 10 | 10 | 10 |
| Panel 2 | 9 (<0.5 mm) | 10 | 10 | 10 |

Dynamic Mechanical Thermal Analysis (DMTA) shows a glass transition temperature (59° C.) exceeding wastewater and potable water application requirements.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. By predominantly hydrocarbon character, it is meant that at least 70% or at least 80% of the atoms in the substituent are hydrogen or carbon.

Examples of hydrocarbyl groups include:

(i) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

(ii) substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy);

(iii) hetero substituents, that is, substituents which, while having a predominantly hydrocarbon character, may contain other than carbon in a ring or chain otherwise composed of carbon atoms.

Representative alkyl groups include n-butyl, iso-butyl, sec-butyl, n-pentyl, amyl, neopentyl, n-hexyl, n-heptyl, secondary heptyl, n-octyl, secondary octyl, 2-ethyl hexyl, n-nonyl, secondary nonyl, undecyl, secondary undecyl, dodecyl, secondary dodecyl, tridecyl, secondary tridecyl, tetradecyl, secondary tetradecyl, hexadecyl, secondary hexadecyl, stearyl, icosyl, docosyl, tetracosyl, 2-butyloctyl, 2-butyldecyl, 2-hexyloctyl, 2-hexydecyl, 2-octyldecyl, 2-hexyldodecyl, 2-octyldodecyl, 2-decyltetradecyl, 2-dodecylhexadecyl, 2-hexyldecyloctyldecyl, 2-tetradecyloctyldecyl, monomethyl branched-isostearyl, and the like.

Representative aryl groups include phenyl, toluyl, xylyl, cumenyl, mesityl, benzyl, phenethyl, styryl, cinnamyl, benzahydryl, trityl, ethylphenyl, propylphenyl, butylphenyl, pentylphenyl, hexylphenyl, heptylphenyl, octylphenyl, nonylphenyl, decylphenyl, undecylphenyl, dodecylphenyl benzylphenyl, styrenated phenyl, p-cumylphenyl, α-naphthyl, β-naphthyl groups, and mixtures thereof.

Heteroatoms include sulfur, oxygen, nitrogen, and encompass substituents as pyridyl, furyl, thienyl and imidazolyl. In general, no more than two, and in one embodiment, no more than one, non-hydrocarbon substituent will be present for every ten carbon atoms in the hydrocarbyl group. In some embodiments, there are no non-hydrocarbon substituents in the hydrocarbyl group.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A hybrid polyurethane/polyurea polymer comprising the reaction product of: a polyol component, a polyamine, and a curing agent, the polyol component comprising a Novolac-type polyol having the general formula of Formula I:

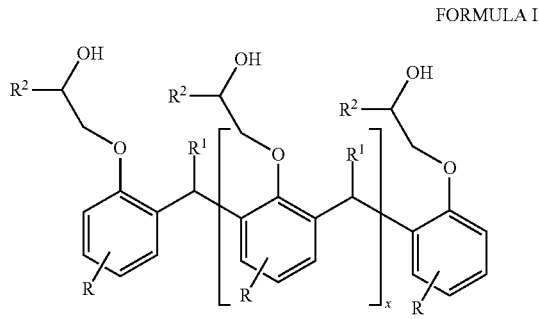

FORMULA I where each R is independently selected from hydrocarbyl groups;
each R1 is independently selected from H and hydrocarbyl groups;
each R2 is independently selected from poly alkylene oxide groups; and
x is at least 1.

2. The hybrid polyurethane/polyurea polymer of claim 1, wherein the reaction is carried out in the presence of a catalyst.

3. The hybrid polyurethane/polyurea polymer of claim 1, wherein the reaction is carried out at a temperature of at least 100° C.

4. The hybrid polyurethane/polyurea polymer of claim 1, wherein a molar ratio of the polyol component to polyamine is from 1:100 to 100:1.

5. The hybrid polyurethane/polyurea polymer of claim 1, wherein a ratio by weight of the polyol component to polyamine is from 20:1 to 1:5.

6. The hybrid polyurethane/polyurea polymer of claim 1, wherein the polyol component further comprises at least a second polyether polyol other than the Novolac-type polyol.

7. The hybrid polyurethane/polyurea polymer of claim 6, wherein the second polyether polyol is selected from a glycerine and propylene oxide based polyether triol, a polyether triol, and mixtures thereof.

8. The hybrid polyurethane/polyurea polymer of claim 6, wherein the at least a second polyether polyol includes at least one of a propylene glycol-based diol, a glycerine-initiated propylene oxide-based triol with an ethylene oxide cap, an amine-based polyol, a glycerine and sucrose-based polyol, and a Mannich-based polyol.

9. The hybrid polyurethane/polyurea polymer of claim 1, wherein the Novolac-type polyol is derived from Cashew Nut Shell Liquid (CNSL).

10. The hybrid polyurethane/polyurea of claim 1, wherein the Novolac-type polyol is derived from greater than 50 wt. % anacardic acid and less than 50 wt. % cardol or its methyl derivatives.

11. The hybrid polyurethane/polyurea of claim 1, wherein the curing agent is a polyisocyanate is selected from diisocyanates and triisocyanates, and mixtures thereof.

12. The hybrid polyurethane/polyurea of claim 1, wherein the polyamine is selected from diamines, triamines and tetramines, and mixtures thereof.

13. The hybrid polyurethane/polyurea polymer of claim 1, wherein a ratio of moles isocyanate groups:moles of hydroxyl and amine groups is from 1.5:1 to 1:1.5.

14. A structure coated with a formulation comprising the hybrid polyurethane/polyurea polymer of claim 1.

15. A coating formulation comprising the hybrid polyurethane/polyurea polymer of claim 1.

16. A two component formulation for preparing a coating comprising the hybrid polyurethane/polyurea polymer of claim 1, wherein the two component formulation includes a first component which includes the curing agent and a second component which includes the polyol component and polyamine.

17. A method for coating a structure comprising applying a two component formulation as a heated mixture to a structure, the two component formulation comprising a first component which includes a curing agent and a second component which includes a polyol component and polyamine, the polyol component comprising a polyether polyol with a phenol-based backbone, the first and second components reacting to form the hybrid polyurethane/polyurea polymer of claim 1.

18. A hybrid polyurethane/polyurea polymer comprising the reaction product of: a polyol component, a polyamine, and a curing agent, the polyol component comprising a Novolac-type polyol having the general formula of Formula I:

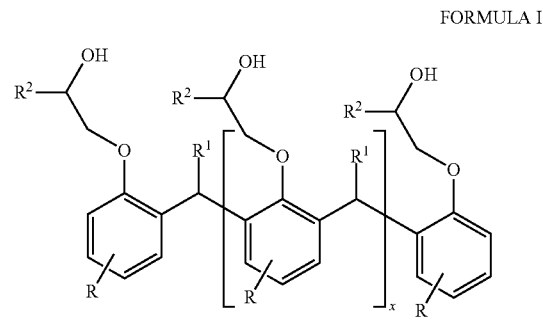

FORMULA I wherein each R is independently selected from C8 and higher fatty acids and mixtures thereof;
each R1 is independently selected from H and hydrocarbyl groups;
each R2 is independently selected from ether groups and poly alkylene oxide groups; and
x is at least 1.

19. A method for forming a hybrid polyurethane/polyurea polymer comprising reacting a polyisocyanate, a polyol component, and a polyamine in the presence of a catalyst, the polyol component comprising a Novolac-type polyol, wherein the Novolac-type polyol has the general formula of Formula I:

FORMULA I
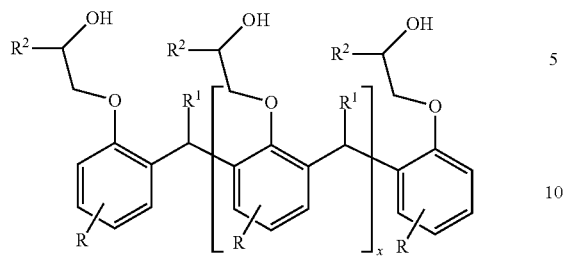
where each R is independently selected from hydrocarbyl groups;
each $R^1$ is independently selected from H and hydrocarbyl groups;
each $R^2$ is independently selected from poly alkylene oxide groups; and
x is at least 1.
* * * * *